3,389,000
COATED FLAVOURINGS AND PREPARATION THEREOF
Eiichiro Fujita, Toyonaka, Kiyofumi Ishii, Ikeda, Hiromi Nakatani, Kobe, and Yuji Nakai and Kiyoshi Katagiri, Suita, Japan, assignors to Takeda Chemical Industries, Ltd., Higashi-ku, Osaka, Japan
No Drawing. Filed Nov. 6, 1964, Ser. No. 409,591
Claims priority, application Japan, Nov. 14, 1963, 38/61,307
8 Claims. (Cl. 99—140)

ABSTRACT OF THE DISCLOSURE

Nucleoside-5'-phosphates in granular form, for use in flavoring for foods and beverages, are protected against degradation by phosphatase, by coating the granules with animal or vegetable fat melting within the range from 40 to 100° C., thereupon releasing the 5'-phosphates in situ in the food or beverage, to which it is added, during the processing of such food or beverage at said temperature. The particular fat employed is correlated to storage and use temperature conditions, and the granule size is adjusted to 16–65 mesh prior to coating.

This invention relates to coated flavorings and a method for preparing them.

As is known, nucleoside-5'-phosphate is put into use as a flavoring for a wide range of foods and beverages. Though nucleoside-5'-phosphate is chemically stable in foods and beverages, it is decomposed by phosphatase, an enzyme which is widely distributed in animals and plants, with resulting loss of flavoring effect. Therefore, in order to flavor foods and beverages with nucleoside-5'-phosphate, it is necessary to inactivate the phosphatase therein and thereafter to add the nucleoside-5'-phosphate to the foods and beverages. Although the inactivation of phosphatase is usually effected by heating the foods and beverages, there are many foods and beverages for which heating is undesirable, and to which addition of the flavoring is impossible after heating. The former are illustrated by bean paste (Japanese Miso), and the latter by ham and sausage.

In order to keep the nucleoside-5'-phosphate stable against the enzyme and to make it available for such foods as mentioned above, it is desirable to coat the nucleoside-5'-phosphate with coating agents which do not break down in the presence of water at room temperature, but which do break down at an elevated temperature. The phosphatase in food and beverages is inactivated at a temperature of 60–70° C. As foods and beverages are generally treated at higher temperature than 60–70° C. during their production or cooking processes, it is necessary for the present coating agent to employ fats which melt on heating.

On the other hand, there are some foods and beverages for which heating is not necessary and there are foods such as so-called "instant soup" which is often required to dissolve in water at a temperature of 40 to 50° C. For application for such foods and beverages, it is desirable to employ fats which melt at a rather low temperature. Furthermore, since the coating agent should not melt at room temperature in summer, it is practically necessary for the purpose of the present invention to coat the nucleoside-5'-phosphate or the flavorings containing it with fats as a coating agent which melt at a temperature of 40 to 100° C.

In case that nucleoside-5'-phosphate or flavorings containing it, which are coated with the coating agent as mentioned above, are added to foods and beverages to be heated, the nucleoside-5'-phosphate is released by melting of the coating, so that it is present in the foods or beverages without being substantially decomposed by active phosphatase.

It is an object of the present invention to provide coated flavorings which are stable against phosphatase, and therefore which are available for all kinds of foods and beverages. Another object of the invention is to provide a method for coating the flavorings. Other objects and advantages will become apparent from the following description.

Among the nucleoside-5'-phosphates to be coated according to the method of the present invention, there may be enumerated the mono-, di- or tri-phosphoric acid esters at the 5-position of ribonucleotides such as adenosine, guanosine, inosine, cytidine, uridine and xanthosine, or of deoxyribonucleotides such as deoxyadenosine, deoxycytidine, deoxyuridine and deoxyxanthosine. Besides such phosphoric acid esters, there are also the various flavorings containing the said phosphoric acid esters, such as the flavorings containing monosodium glutamate, table salt or other flavorings or seasons in addition to the phosphoric acid ester.

The present inventors observed a correlation between size of coated granule of nucleoside-5'-phosphate and rate with which the phosphate is released from the granule coating, with the result shown in Example 1. The obtained result shows that said rate is smaller in a larger coated granule than in small one. The result was confirmed by actual tests wherein coated phosphate granules of various sizes were added to soybean paste, ham and sausage, and wherein the rate with which the phosphate is released from the coatings of the respective granules was observed. That is, the larger the size of a coated granule, the smaller is the rate with which the phosphate in the granule is released from the granule coating, and the more stable is the phosphate in the coated granule against phosphatase. However, another problem arises in that a granule of rather large size is inclined to break during the production process, and that, to make the matter worse, the flavoring effect becomes poor as the size of the granules becomes larger. From the correlation among the above-mentioned facts, the present inventors have found that a coated granule of 16–65 mesh is most suitable and convenient for practice use.

The coating agents which may be employed for the purpose of the present invention are edible fats melting at 40–100° C., more preferably at 55–85° C., which are suitable for use in foods and beverages. The fats may be derived from animals or plants. More concretely, among the fats, there may be enumerated hardened oils obtained by hydrogenation of such oils as soybean oil, cottonseed oil, almond oil, castor oil, linseed oil, mustard seed oil, olive oil, orange seed oil, apricot-kernel oil, coconut oil, corn oil, grapefruit seed oil, palm oil, palm-kernel oil, peanut, rapeseed oil, sunflower seed oil, tea seed oil, sesame oil, safflower oil, and rice-bran oil, or such fats as tallow (goat, mutton, beef), lard, and butter-fat (goat, cow). These fats may be used solely or in mixture of two or more thereof.

Any known means may be employed for coating the nucleoside-5′-phosphate or flavorings containing it with the coating agents (fats) mentioned above.

Among such means, there are included the following:

(1) The means wherein the nucleoside-5′-phosphate is homogeneously admixed with a coating agent in a melted state and subsequently the obtained homogeneous mixture is sprayed off into cool atmosphere, (2) The means wherein the nucleoside-5′-phosphate is admixed with a solution of a coating agent dissolved in a suitable solvent, and thereafter the obtained mixture is dried to remove the solvent, (3) The means wherein the nucleoside-5′-phosphate is put in a coating pan and a liquid coating agent is sprayed on the phosphate to coat it, (4) The means wherein the nucleoside-5′-phosphate is floated in an air stream and a solution of a coating agent is sprayed on the floating phosphate to coat it, and (5) The means wherein the nucleoside-5′-phosphate is coated with a film made of a coating agent.

The coated nucleosides-5′-phosphate and flavorings containing it, which are prepared according to the method of the present invention, are very stable in foods and beverages containing phosphatase, and display flavoring effect as the coat melts away by heating in the production or cooking of the foods and beverages to which the coated flavorings are added.

For the purpose of giving those skilled in the art a better understanding of the invention, the following illustrative examples are given. The "mesh" in the present specification is that of Tyler standard sieve.

Example 1

6 kilograms of hardened plant oil (a mixture of safflower oil and soybean oil, melting point: 58–62° C.; acidity: <0.9; iodine value: <2.0; saponification value: 190–200; ash: <0.01%), is melted by heating at 80–85° C. To the melted oil, 2 kilograms of nucleoside-5′-phosphate (a mixture of sodium 5′-inosinate and sodium 5′-guanylate, smaller than 150 mesh) are added and admixed by a mixer. The obtained mixture is sprayed off into a cool room at about 20° C. by a pressure sprayer which can suitably be controlled and, after cooling, the formed granules are collected. The rates with which the phosphates are released from the coatings of thus obtained granules (five kinds of granules of the following sizes: 16–28 mesh, 28–35 mesh, 35–48 mesh, 28–65 mesh, 65–100 mesh, and smaller than 100 mesh) were observed. The result is shown in the following table.

In this test, 20 milliliters of distilled water (30° C.) are added to the respective sample, and after the mixture is shaken by a shaker, it is filtered, and the optical density of thus obtained filtrate observed:

| Size of Samples | Rates with which nucleoside-5′-phosphate is released from granule coatings, percent | | | | |
|---|---|---|---|---|---|
|  | After 1 minute | After 5 minutes | After 15 minutes | After 30 minutes | After 60 minutes |
| Smaller than 100 mesh | 64 | 89 | 94 | 97 | 98 |
| 65–100 mesh | 38 | 64 | 70 | 74 | 79 |
| 28–65 mesh | 7 | 14 | 22 | 24 | 28 |
| 35–48 mesh | 4 | 8 | 14 | 16 | 18 |
| 28–35 mesh | 2 | 6 | 9 | 11 | 14 |
| 16–28 mesh | 0 | 3 | 5 | 8 | 10 |

Example 2

6 kilograms of a coating agent (a mixture of 8 parts by weight of hardened plant oil and 2 parts by weight of acetoglyceride) is melted by heating at 80–85° C. To the melted oil, 2 kilograms of sodium 5′-inosinate (smaller than 200 mesh) are added and admixed by a mixer. After the mixture is passed through a colloid-mill while warm, it is sprayed off into a cool room at about 20° C. by a pressure sprayer which can suitably be controlled and, after cooling, the formed granules are collected.

The stability of thus obtained coated granules (2 kinds: smaller than 100 mesh and 16–65 mesh granules) and uncoated sodium 5′-inosinate in soybean paste (Japanese Miso) was observed. The result is shown in the following table:

|  | Residual rate of sodium 5′-inosinate, percent | | |
|---|---|---|---|
|  | Uncoated granules | Coated granules (smaller than 100 mesh) | Coated granules (16–65 mesh) |
| Just after the addition | 104 | 96 | 102 |
| 1 hour after | 89 | 85 | 94 |
| 2 hours after | 82 | 76 | 89 |
| 1 day after | 0 | 32 | 85 |
| 1 week after |  | 15 | 85 |

Example 3

Test for examining stability (residual rate) of coated nucleoside-5′-phosphate in a sausage.

Sausage made of the following materials:

| | | |
|---|---|---|
| Pork | kilograms | 5 |
| Beef | do | 2 |
| Horseflesh | do | 1 |
| Mutton | do | 2 |
| Table salt | grams | 250 |
| Potassium nitrate | do | 10 |
| Wheat flower | do | 300 |
| Monosodium glutamate | do | 20 |
| Pepper | do | 4 |
| Nutmeg | do | 3 |
| Coriander | do | 2 |
| Clove | do | 2 |
| Iced water | kilograms | 2 |

Amount of the coated phosphate to the whole amount of the sausage: 0.0364%.

Coating agent: a hardened plant oil containing safflower oil as a main component.

Size of the coated granule: 16–65 mesh. The granules were prepared in the same way as in Example 2.

Result, residual rate (percent):

|  | Heating just after the addition of samples to the sausage | Heating after standing at 20–25° C. for 3 hours | Heating after standing at room temperature (20° C.) for a week |
|---|---|---|---|
| Coated | 90.7 | 83.0 | 80.0 |
| Uncoated | 35.0 | 0 | 0 |

What is claimed is:

1. A coated flavoring in a granular form, which contains nucleoside-5′-phosphate as a flavoring component, the coating agent being fat melting at 40 to 100° C., and the size of each granule being in the range from 16 to 65 mesh.

2. A coated flavoring in a granular form which contains nucleoside-5′-phosphate as a flavoring component, the coating agent being fat melting at 55 to 85° C., and the size of each granule being in the range from 16 to 65 mesh.

3. A coated flavoring in a granular form, which contains nucleoside-5′-phosphate as a flavoring component, the coating agent being fat melting at 58 to 62° C., and the size of each granule being in the range from 16 to 65 mesh.

4. A method for coating nucleoside-5'-phosphate with fat melting at 40 to 100° C. to make coated granules of 16 to 65 mesh, which comprises admixing the nucleoside-5'-phosphate with fat in a melted state and subsequently spraying off the obtained homogeneous mixture into cool atmosphere.

5. A method for coating nucleoside-5'-phosphate with fat melting at 55 to 85° C. to make coated granules of 16 to 65 mesh, which comprises admixing the nucleoside-5'-phosphate with fat in a melted state and subsequently spraying off the obtained homogeneous mixture into cool atmosphere.

6. A method for coating flavoring containing nucleoside-5'-phosphate with fat melting at 40 to 100° C. to make coated granules of 16 to 65 mesh, which comprises admixing said flavoring with fat in a melted state and subsequently spraying off the obtained homogeneous mixture into cool atmosphere.

7. A method for coating flavoring containing nucleoside-5'-phosphate with fat melting at 55 to 85° C. to make coated granules of 16 to 65 mesh, which comprises admixing said flavoring with fat in a melted state and subsequently spraying off the obtained homogeneous mixture into cool atmosphere.

8. A coated flavoring in granular form, which contains as a flavoring component nucleoside-5'-phosphate selected from the group consisting of the mono-, di- and tri-5'-phosphates of adenosine, guanosine, inosine, cytidine, uridine, xanthosine, deoxyadenosine, deoxycytidine, deoxyuridine and deoxyxanthosine, the coating agent being fat selected from the group consisting of hydrogenated soybean oil, hydrogenated cottonseed oil, hydrogenated almond oil, hydrogenated castor oil, hydrogenated linseed oil, hydrogenated mustard seed oil, hydrogenated olive oil, hydrogenated orange seed oil, hydrogenated apricot-kernel oil, hydrogenated coconut oil, hydrogenated corn oil, hydrogenated grapefruit seed oil, hydrogenated palm oil, hydrogenated palm-kernel oil, hydrogenated peanut oil, hydrogenated rapeseed oil, hydrogenated sunflower seed oil, hydrogenated tea seed oil, hydrogenated sesame oil, hydrogenated safflower oil, hydrogenated rice-bran oil, tallow, lard and butter fat, and the size of each granule being in the range from 16 to 65 mesh.

References Cited

UNITED STATES PATENTS

| | | | |
|---|---|---|---|
| 2,685,517 | 8/1954 | Dunmire | 99—140 X |
| 3,080,293 | 3/1963 | Koff | 99—11 X |

FOREIGN PATENTS

| | | |
|---|---|---|
| 514,047 | 10/1939 | Great Britain. |

A. LOUIS MONACELL, *Primary Examiner.*

H. H. KLARE, *Assistant Examiner.*